United States Patent
Combs et al.

(10) Patent No.: US 10,507,422 B2
(45) Date of Patent: Dec. 17, 2019

(54) LOCALIZED VENTILATION SYSTEMS AND METHODS

(71) Applicant: SPRIMO, INC., Santa Clara, CA (US)

(72) Inventors: Raymond Combs, San Jose, CA (US);
Chunxiao Han, Dublin, CA (US);
Daniel K. Harden, Palo Alto, CA (US);
Jovan Pantelic, Berkeley, CA (US)

(73) Assignee: Sprimo, Inc., Santa Clara, CA (US)

( * ) Notice: Subject to any disclaimer, the term of this patent is extended or adjusted under 35 U.S.C. 154(b) by 144 days.

(21) Appl. No.: 15/276,517

(22) Filed: Sep. 26, 2016

(65) Prior Publication Data

US 2017/0087500 A1 Mar. 30, 2017

Related U.S. Application Data

(60) Provisional application No. 62/233,268, filed on Sep. 25, 2015.

(51) Int. Cl.
| | |
|---|---|
| *B03C 3/32* | (2006.01) |
| *B01D 46/04* | (2006.01) |
| *B01D 46/02* | (2006.01) |
| *B01D 46/46* | (2006.01) |
| *B01D 35/30* | (2006.01) |

(Continued)

(52) U.S. Cl.
CPC ......... *B01D 46/46* (2013.01); *B01D 46/0047* (2013.01); *B01D 46/2403* (2013.01); *B01D 46/429* (2013.01); *B01D 46/4236* (2013.01); *B01D 46/442* (2013.01); *B01D 46/448* (2013.01); *F04D 17/16* (2013.01); *F04D 29/703* (2013.01); *F24F 3/1603* (2013.01);

*F24F 7/06* (2013.01); *F24F 11/0001* (2013.01); *F24F 11/30* (2018.01); *F24F 2110/64* (2018.01); *F24F 2120/10* (2018.01); *F24F 2221/38* (2013.01)

(58) Field of Classification Search
CPC .......... B03C 3/32; B01D 46/04; B01D 46/02; B01D 46/46; B01D 35/30; B01D 45/12; B01D 50/00
USPC ....... 55/385.2, 356, 337, 472, 473, DIG. 21, 55/DIG. 34; 96/384, 381, 380, 388, 424, 96/397, 417, 422
See application file for complete search history.

(56) References Cited

U.S. PATENT DOCUMENTS 2,488,467 A * 11/1949 De Lisio ............... F04D 29/403
239/561
3,776,121 A * 12/1973 Truhan ................... F24F 3/044
454/187

(Continued)

*Primary Examiner* — Minh Chau T Pham
(74) *Attorney, Agent, or Firm* — Fish IP Law, LLP

(57) ABSTRACT

Systems and Apparatus for a personal ventilation system that provides a personalized column of clean air surrounding a user's space is presented. The personal ventilation system includes an air purifier with a fan and an annular gap downstream of the fan. The annular gap has an inner radius that is within 95% of the outer radius. The annular gap structure allows the air purifier to produce a column of air with an entrainment ratio lower than other commercially available fan. At a distance of 1.5 meters, the air purifier is configured to have an entrainment ratio of lower than 40%. The air purifier also has a removable filter located upstream of the fan. The ventilation system is capable of delivering highly-localized filtered air to a user or location.

24 Claims, 9 Drawing Sheets

(51) Int. Cl.
*B01D 45/12* (2006.01)
*B01D 50/00* (2006.01)
*F24F 3/16* (2006.01)
*F24F 11/00* (2018.01)
*B01D 46/00* (2006.01)
*B01D 46/24* (2006.01)
*B01D 46/42* (2006.01)
*B01D 46/44* (2006.01)
*F24F 7/06* (2006.01)
*F04D 17/16* (2006.01)
*F04D 29/70* (2006.01)
*F24F 11/30* (2018.01)
*F24F 110/64* (2018.01)
*F24F 120/10* (2018.01)

(56) References Cited

U.S. PATENT DOCUMENTS

| | | | |
|---|---|---|---|
| 5,435,817 A | 7/1995 | Davis et al. | |
| 5,601,636 A * | 2/1997 | Glucksman | F24F 3/1603 55/356 |
| 5,711,785 A * | 1/1998 | Maxwell | B01D 46/002 55/283 |
| 5,888,261 A * | 3/1999 | Fortune | F04D 29/703 416/146 R |
| 5,904,744 A * | 5/1999 | Kagan | B01D 46/0005 55/385.1 |
| 6,045,329 A * | 4/2000 | Sobala | F04D 29/703 416/146 R |
| 6,123,618 A * | 9/2000 | Day | F04D 25/088 454/230 |
| 6,156,085 A | 12/2000 | Chiu | |
| 6,361,590 B1 * | 3/2002 | Gilbert, Jr. | B01D 46/0043 55/385.1 |
| 6,660,070 B2 * | 12/2003 | Chung | B01D 46/008 96/424 |
| 7,399,332 B1 * | 7/2008 | Morey | A47L 9/102 55/318 |
| 8,308,536 B2 | 11/2012 | Kristensson et al. | |
| 9,719,525 B2 * | 8/2017 | Cunnane | F04D 25/088 |
| 2003/0188520 A1 * | 10/2003 | Boulva | B01D 46/106 55/467 |
| 2008/0264019 A1 * | 10/2008 | Walker | B01D 46/10 55/488 |
| 2010/0293907 A1 * | 11/2010 | Zheng | A61L 9/16 55/337 |
| 2014/0260994 A1 * | 9/2014 | Grider | B01D 46/0004 96/399 |
| 2015/0075373 A1 | 3/2015 | Miller | |
| 2015/0308440 A1 * | 10/2015 | Yang | F04D 25/088 417/423.14 |
| 2016/0051719 A1 * | 2/2016 | Watanabe | A61L 9/205 422/121 |
| 2016/0311951 A1 | 10/2016 | Reichelt et al. | |
| 2018/0328605 A1 * | 11/2018 | Bae | B01D 46/42 |

* cited by examiner

LOCALIZED VENTILATION SYSTEMS AND METHODS

This application claims the benefit of priority to U.S. Provisional Application 62/233,268 filed Sep. 25, 2015, the contents of which are incorporated by reference in their entireties. Where a definition or use of a term in a reference that is incorporated by reference is inconsistent or contrary to the definition of that term provided herein, the definition of the term provided herein is deemed to be controlling.

FIELD OF THE INVENTION

The field of the invention is air purification systems.

BACKGROUND

The background description includes information that may be useful in understanding the present inventive subject matter. It is not an admission that any of the information provided herein is prior art or relevant to the presently claimed inventive subject matter, or that any publication specifically or implicitly referenced is prior art.

Air quality is a concern in many parts of the world. Pollution, dust, allergens, and air-borne pathogens significantly impact the health of millions of people on a daily basis. As a result, many people use air purifiers in an attempt to clean the air that they breathe.

Conventionally, air purifiers work to improve indoor air quality through a form of displacement ventilation by replacing low-quality air with purified air. In conventional air purifiers, purifying capacity is maximized by running at a high CFM (Cubic Feet per Minute) with the assumption that the cleaner air will circulate within the entire room. The intention is that, given enough time, the clean air will displace a majority of the dirty air within the room, thus creating an overall lower pollutant concentration within the room without regard to the exact location the person occupies within the room.

For example, U.S. Pat. No. 5,435,817 to Davis et. al. teaches a portable and compact room air purifier having an internal filter element through which air is drawn by a centrifugal fan and wherein the air is discharged generally uniformly throughout the room. This approach relies on displacement ventilation to purify the air in the room.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Conventional home and office air purifiers have traditionally emphasized high CFM. However, there are many drawbacks of this method. For example, high CFM air cleaners consume more energy, create more noise, and must be constantly running to maintain the level of air cleanness. Additionally, when in operation, doors and windows need to be closed so as to not contaminate the air within the whole room. Also, natural leaking of air through gaps in the walls or the dust in any air ducts can add to the pollutants within the room.

There has been some attempt to overcome these issues with air contamination, in settings such as operation rooms and passenger aircraft. For example, U.S. Pat. No. 8,308,536 to Kristensson et. al, discloses a ceiling mounted ventilation device for providing clean air in a workplace region, such an operating theatre or laboratory. This approach relies on multiple air supply units to create a clean air zone.

In another example, U.S. patent application Ser. No. 2009/0311951A1 by Walkinshaw, discloses a aircraft ventilation system that relies on entrainment of ambient air within a primary stream of pressurized air to provide a localized air curtain. However, these and other similar solutions have many shortcomings. For example, both require large mechanized systems with multiple airflows to create a zone of clean air. Additionally, they are not customizable and limit a person's ability to move or work freely while maintaining a zone of clean air.

Thus, there is a need for an improved air purification system.

SUMMARY OF THE INVENTION

One aspect of the inventive subject matter relates to a ventilation system with a fan and a casing. The casing encloses the fan and has a front surface with an annular gap. The annular gap has an inner radius that is within 40%, and preferably within 95% of its outer radius. The fan is configured to push a flow of air through the gap out of the ventilation system.

In some embodiments, the ventilation system also comprises an airflow path within the casing and a filter disposed within the airflow path upstream of the fan. In some embodiments, the filter is removable and replaceable.

In one aspect of the inventive subject matter, the casing further comprises an intake configured to pull air into the ventilation system via the airflow path. The fan is configured to pull air into the ventilation system through the intake, and push air out of the ventilation system through the gap.

In some embodiments of the inventive subject matter, the airflow path is configured to draw air into the center of the ventilation system. The airflow path narrows as it approaches the outer edge of the casing toward the gap. In some embodiments, the ventilation system includes a ring of fins disposed within the airflow path and interposed between the fan and gap.

In one aspect of the inventive subject matter, the fan can be one of a cylinder fan, a propeller, or an impeller. In some embodiments, an area of the front surface of the casing between a center of the front surface and the annular gap is solid. In some embodiments, the inner radius of the annular gap is within 80% of the outer radius.

In one aspect of the inventive subject matter, the annular gap and fan are configured to cause the flow of air out of the ventilation system to have an entrainment ration of less than 40% at a distance of 1.5 m. In some embodiments, the casing of the ventilation system is coupled to a base at a hinge, and the hinge is configured to rotate the casing with respect to the base.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
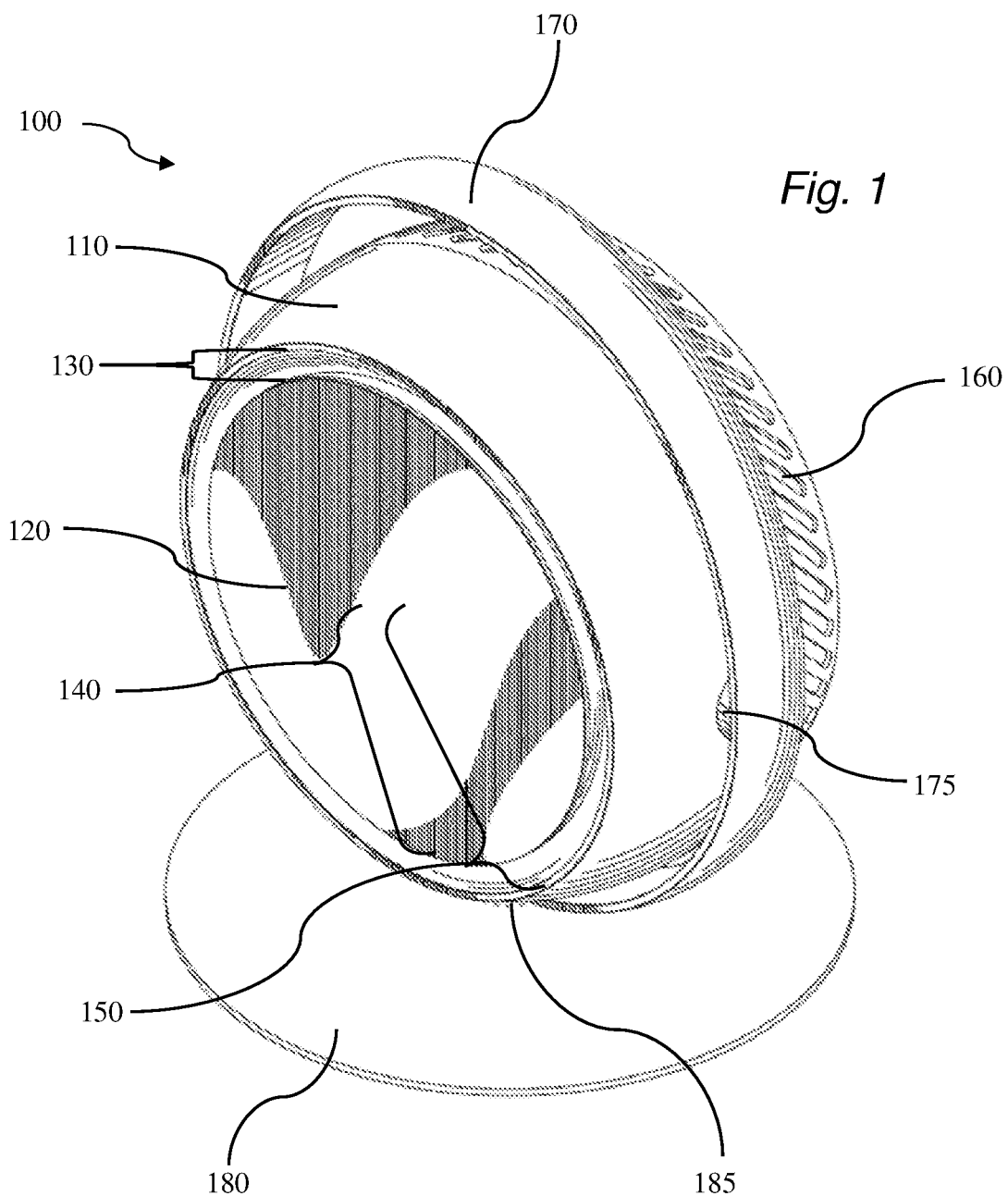
FIG. 1 is a front right-side view of a portable ventilation system.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present inventive subject matter relates to an air purifier system, either a portable air purifier or an embedded system in a building, to improve indoor air quality and perceived air quality by utilizing a method of personal ventilation. The following apparatus, systems and methods describe an air purifier that narrowly delivers a column of fresh, clean air to a specific area while minimizing dilution. The inventive subject matter has many advantages, including energy savings, a decrease in noise level, decreased equipment running time, accommodation of limited room size requirements, increased perceived air quality, and removal of constraints such as door or window air leaks, which negatively affecting the occupant's breathable air. Air purifiers typically work by passing ambient, un-clean air through an air-filter via a fan. As used herein, the term "air purifier" is synonymous with "ventilation system," "personal filter," or "personal fan," or "air cleaner" and "air purifier" or any other term to indicate a device or system to remove pollutants, particulates, volatile organic compounds, gasses, odors, or other undesirable particles or substances from the air within a home or building.

FIG. 1 illustrates a front-side perspective view of an example air purifier 100. In some embodiments, air purifier 100 has a casing 110, a fan (not shown), and a filter (not shown). Casing 110 surrounds the internal elements, such as the fan and the filter, of air purifier 100. It is contemplated that casing 110 can be constructed from a commercially-suitable plastic, fiberglass, metal, glass, or organic based material, or combinations of these materials.

In some embodiments, casing 110 has front surface 120. Front surface 120 has an annular or ring-shaped gap 130 with an inner-radius 140 and an outer radius 150. In some embodiments, air purifier 100 pushes clean, filtered air out of air purifier 100 via gap 130. In some embodiments, front surface 120 is solid except for the gap 130, meaning that filtered air can only exit air purifier 100 via gap 130, which is located toward the edge of front surface 120 in this example. In other embodiments, gap 130 can be located in other areas of front surface 120 of air purifier 100. Casing 110 also has a back surface with an intake 160 that allows unfiltered or ambient air to enter into air purifier 100. In some embodiments, intake 160 may comprise a plurality of holes, slits, or openings.

In some embodiments, casing 110 is coupled to a support structure including a ring 170 and base 180 via hinges 175 and 185. Hinges 175 and 185 allow the casing 110 to rotate with respect to the ring 170 and base 180, which allows air purifier 100 to direct the flow of clean air in different directions (e.g., tilted upward, tilted downward, rotating to the left and to the right, etc.).

Figure 2:
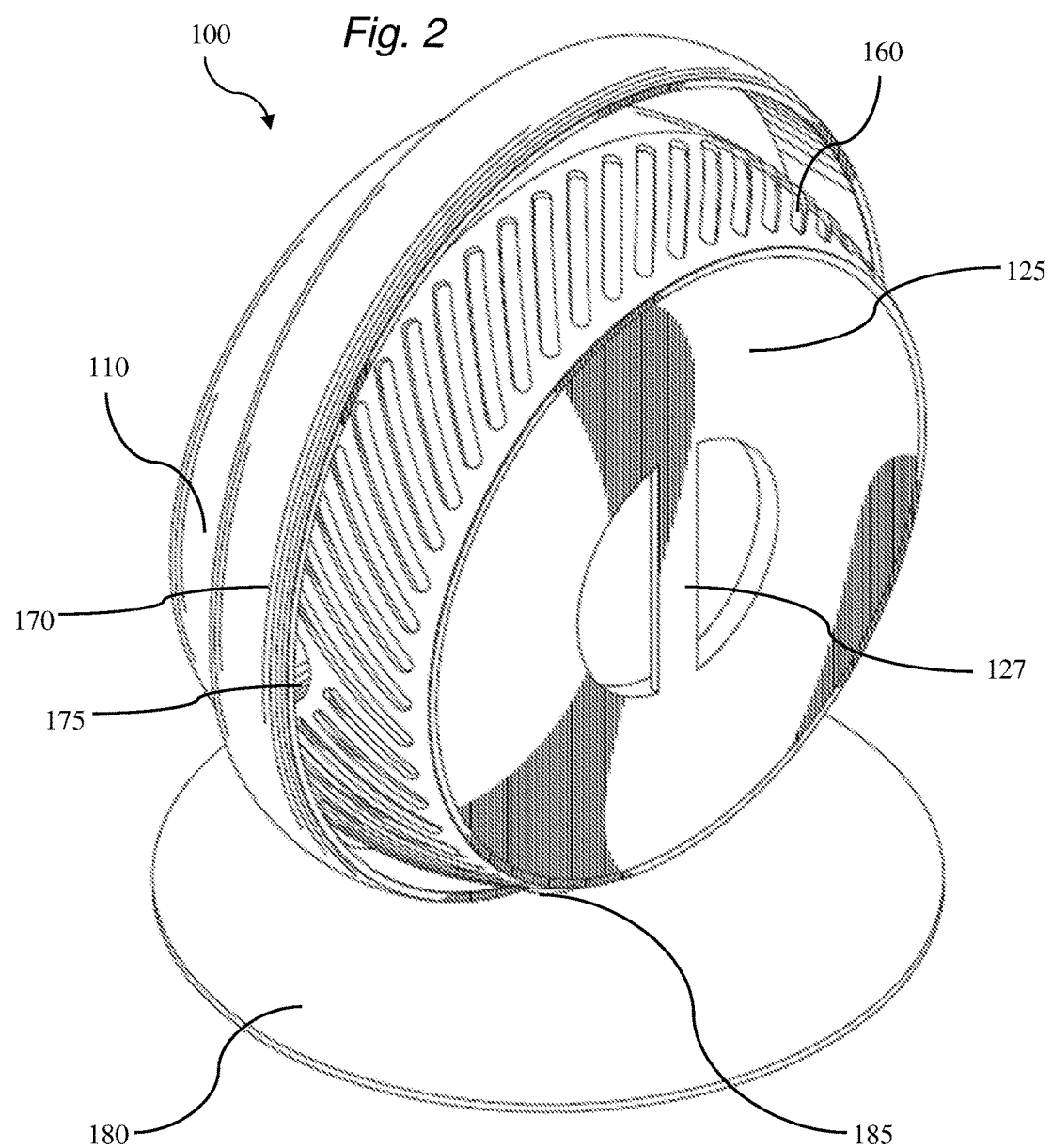
FIG. 2 is a back left-side view of a portable ventilation system.

FIG. 2 illustrates a back-side perspective view of air purifier 100, showing casing 110. Casing 110 has a back surface 125 with one or more intakes 160. Back surface 125 further comprises handle 127, which may be used to open casing 110 to allow access to a filter. In some embodiments, the back surface 125 is coupled with the filter such that a user can use handle 127 to remove and/or replace the filter. Casing 110 is coupled to ring 170 via hinge 175, and is coupled to base 180 via hinge 185.

Figure 3:
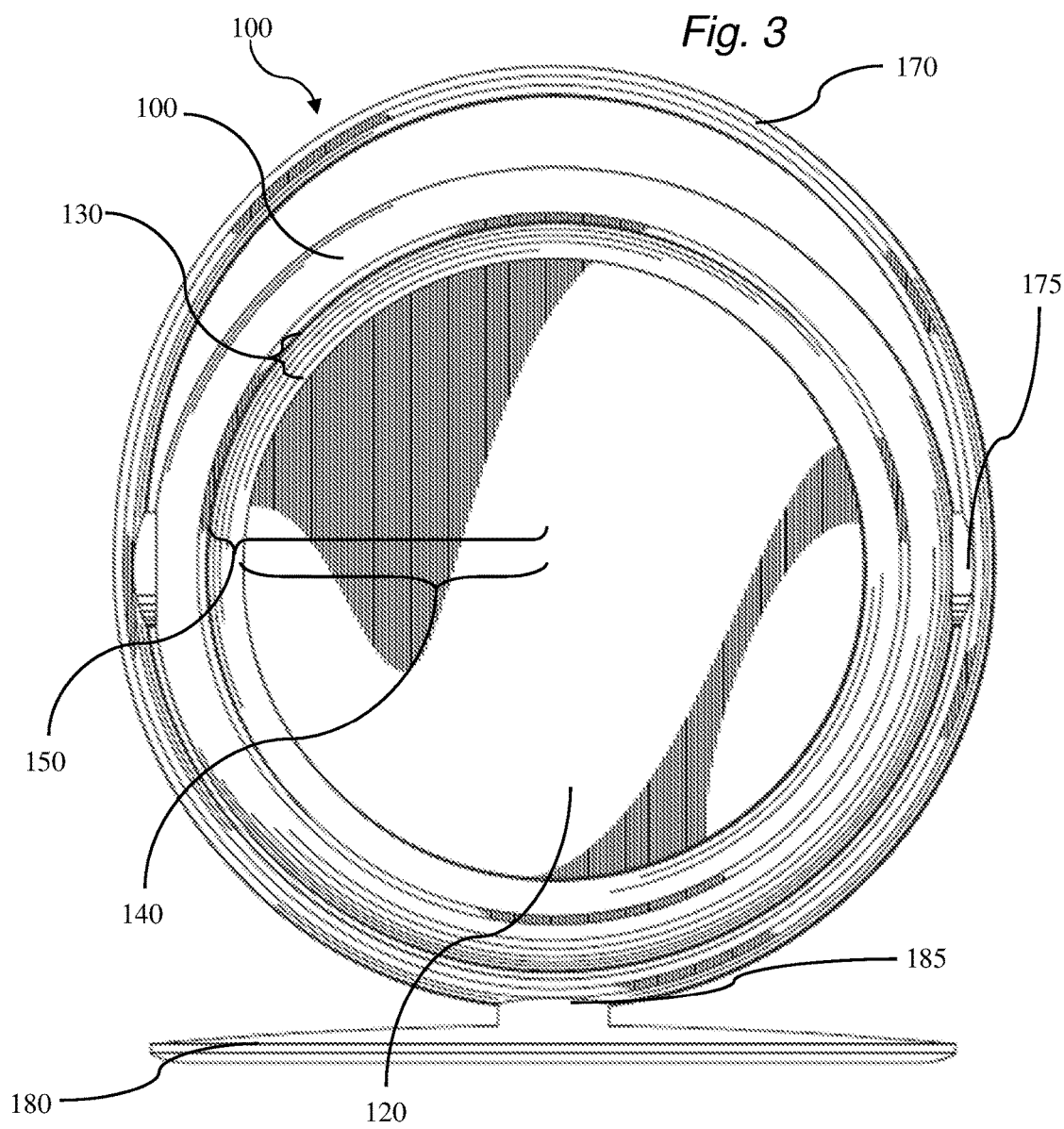
FIG. 3 is a back view of a portable ventilation system.

FIG. 3 illustrates a front-side elevation view of air purifier 100, with casing 110, front surface 120, gap 130. Gap 130 has inner-radius 140 and outer-radius 150. Casing 110 is coupled to ring 170 via hinge 175 and base 180 via hinge 185.

Figure 4:
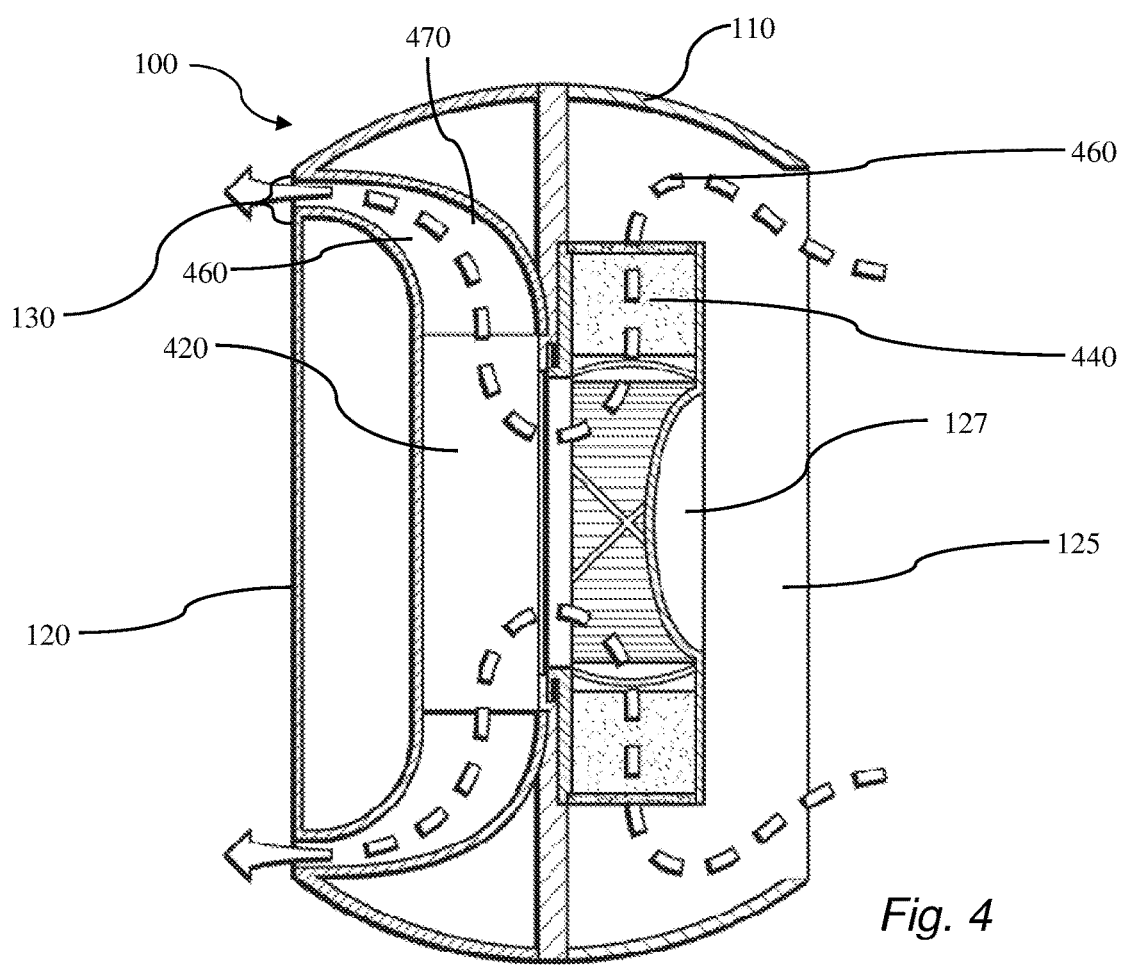
FIG. 4 is a horizontal cross-section of a portable ventilation system.

FIG. 4 illustrates a top horizontal cross-section of air purifier 100 to show the internal elements of air purifier 100. Air purifier 100 has casing 110, front surface 120, gap 130, and back surface 125. Air purifier 100 further comprises fan 420, filter 440, and horn-shaped pathway 470. In some embodiments, filter 440 is coupled to handle 127. The inner dimensions of casing 110 are structured to create an air flow path 460. Fan 420 is configured to direct ambient air (from the atmosphere) to enter casing 110 from inlet 160 through the back of the air purifier 100, through the center of air purifier 100, through horn-shaped pathway 470 and out the front of air purifier 100 through gap 130, as indicated by the dotted line arrows. In some embodiments filter 440 is disposed upstream from fan 420, so that fan 420 pulls ambient or unclean air through filter 440, then pushes the clean air through horn-shaped pathway 470 and then gap 130 out of the air purifier. In some embodiments, air flow path 460 is wider in the center of air purifier 100 and gradually narrows as it approaches the outer rim of casing 110 toward gap 130.

The horn-shaped pathway 470 connects the interior structure at the center of the casing 110 (where clean air exits filter 127) to gap 130. As shown, the cross section of horn-shaped pathway 470 gradually reduces in size from the end that connects the center of the casing 110 to the end that connects gap 130. In some embodiments, the horn-shaped pathway 470 also curves at substantially 90 degrees (substantially herein shall mean very close to what is specified here, e.g., within 5%, within 1%, etc.), creating a horn shape when viewed from the cross-section. In some embodiments, the cross-section of horn-shaped pathway 470 at the end that connects gap 130 has a size that is less than 50% of the size of the cross-section of horn-shaped pathway 470 at the end that connects the center of the casing 110. Preferably, the cross-section of horn-shaped pathway 470 at the end that connects gap 130 has a size that is less than 30% of the size of the cross-section of horn-shaped pathway 470 at the end that connects the center of the casing 110. Even more preferably, the cross-section of horn-shaped pathway 470 at the end that connects gap 130 has a size that is less than 20% of the size of the cross-section of horn-shaped pathway 470 at the end that connects the center of the casing 110. In some embodiments, the horn-shaped pathway 470 also curves substantially in a phi-based shape.

In some embodiments, the flow of the air via air flow path 460 is as follows: unfiltered or ambient air is pulled into air purifier 100 via intake 160, which can be located along an outer edge of back surface 125. Unfiltered air is then pulled through filter 440 toward the center of casing 110 via fan 420. Fan 420 then pushes the filtered air toward gap 130 through horn-shaped pathway 470. In some embodiments, downstream from fan 420, air flow path 460 (that is, the diameter of the cross section of horn-shaped pathway 470 at the end that connects the center of the casing 110) has a maximum width that is substantially the same size as a width of a blade of fan 460. In some embodiments, the width of airflow path 460 gradually narrows as the airflow path 460 moves toward gap 160. In some embodiments air flow path 420 makes preferably 30-90 degree, more preferably a 45-90 degree, and most preferably a 60-90 degree angle change of direction immediately downstream from fan 460.

Fan 420 can be implemented as any type of device that can entrain a flow of air. In some embodiments, fan 420 is a cylindrical fan. In other contemplated embodiments, fan 420 can be a propeller or an impeller. It is further contemplated that the blades of fan 420 can be different sizes and be situated at different angles in order to adjust properties of the airflow out of the fan. In some embodiments filter 440 can be an HEPA filter, different grades of MERV filter, activated carbon filter, other gas absorption filter, photo catalysis filter, UV filter, antibacterial filter or ionization filter, or a combination of different filter types. Additionally, in some embodiments, filter 440 can be removable or replaceable. Details of the filter, including its structure, can be found in the co-owned, co-pending application titled "Filter Customization Systems and Methods," which is incorporated by reference herein in its entirety.

Figure 5:
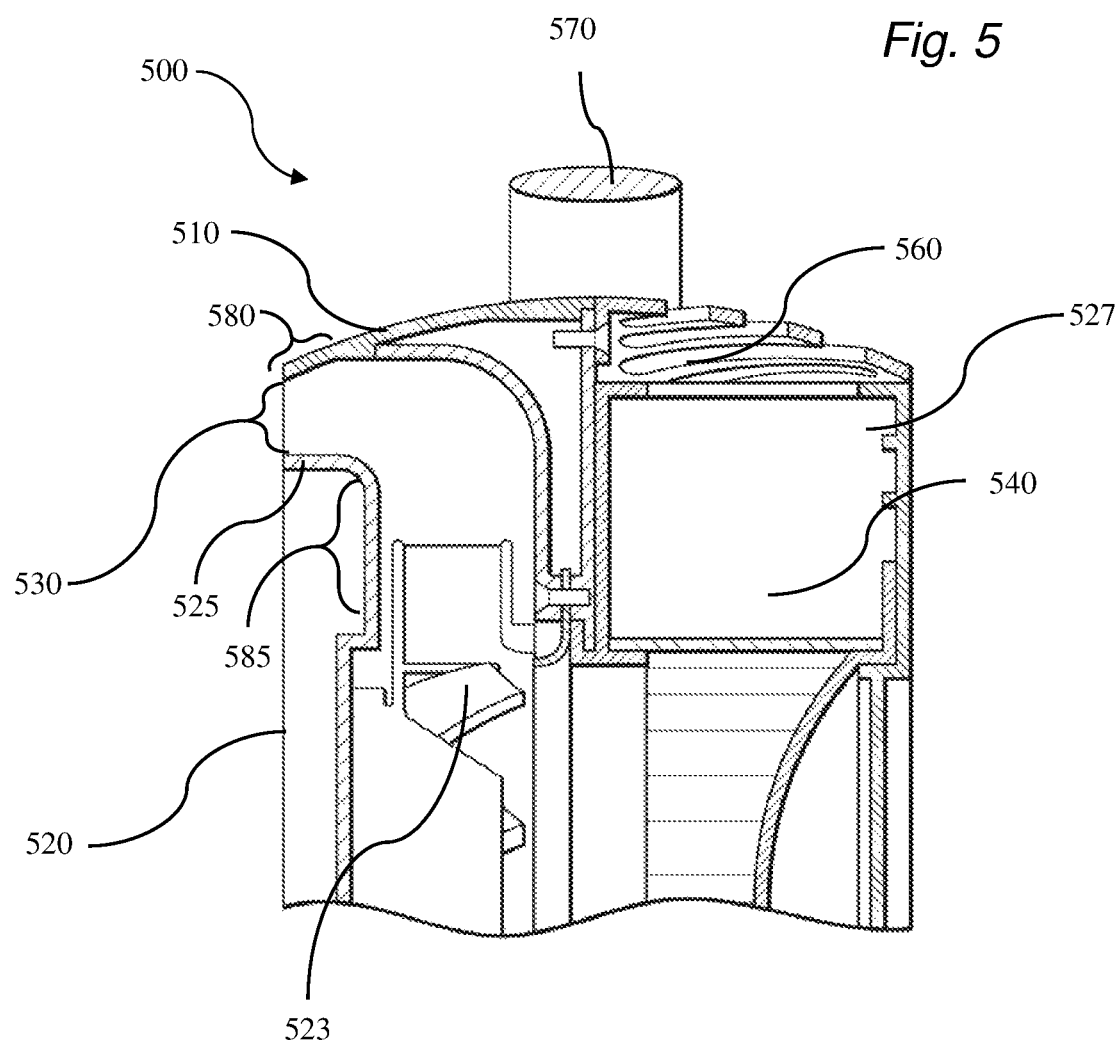
FIG. 5 is a vertical cross-section of a portable ventilation system.

FIG. 5 shows a vertical cross section view of air purifier 500. Air purifier 500 has casing 510, front surface 520, gap 530, back surface 527, intake 560, ring 570, fan 523, and filter 540. The structure within air purifier 500 creates a pathway 525 that is very similar to the horn shaped pathway 470 of FIG. 4, except that pathway 525 has an abrupt narrowing at the end close to gap 530. Specifically, pathway 525 includes a front section 585 that connects to the center of the casing 510 (connects to where clean air coming out from the filter 540) and an end section 580 that connects to gap 530. The end section 580 is substantially smaller than the front section 585. In some embodiments, the length of the end section 580 occupies only less than 20% (preferably less than 15%, and even preferably less than 10%) of the entire length of the pathway 525. As shown, the size of the cross section of the front section 585 remains substantially constant while the size of the cross section of the end section 580 decreases abruptly in the direction toward gap 530. This configuration allows clean air to efficiently form column of air and reduces entrainment with ambient air after the clean air exits air purifier 500.

Figure 6:
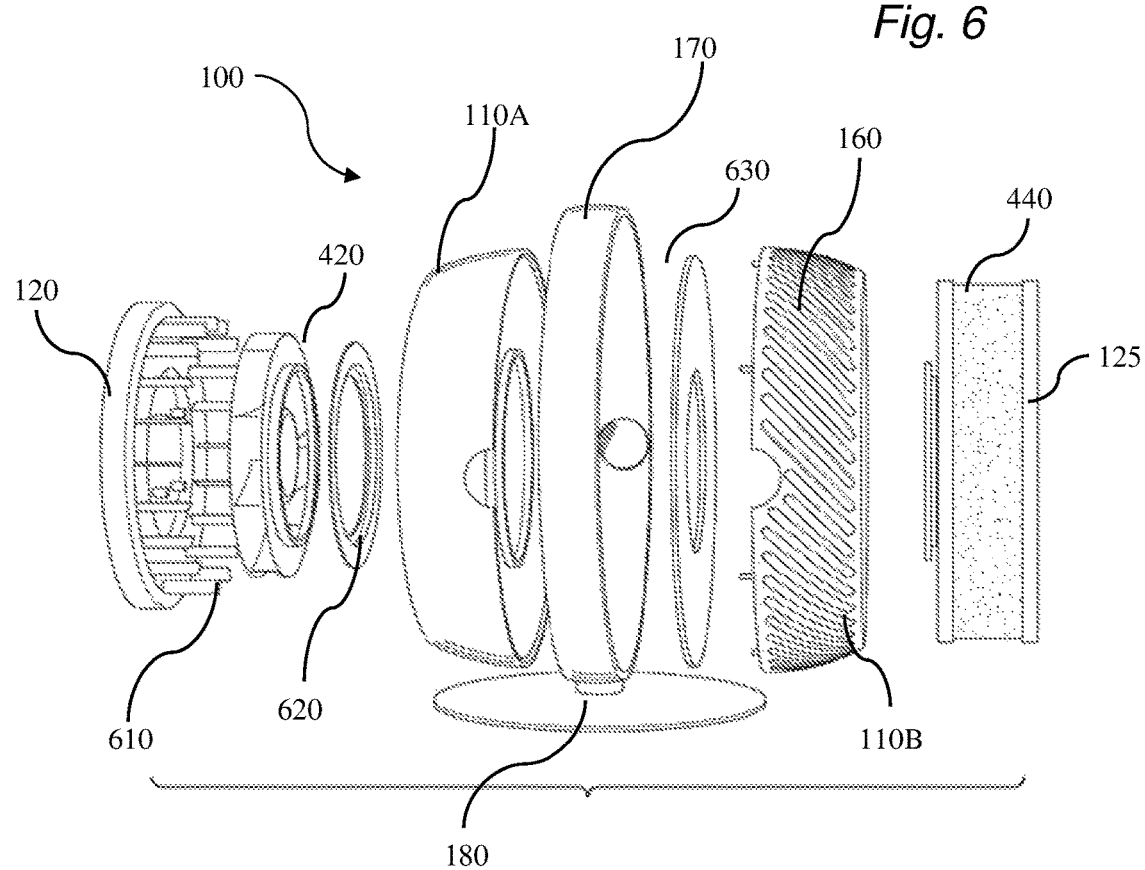
FIG. 6 is right-side expanded view of a portable ventilation system.

FIG. 6 shows an expanded view of air purifier 100. Air purifier 100 has casing 110, which is comprised of front casing 110A and back casing 110B. Air purifier 100 also has front surface 120, back surface 125, intake 160, ring 170, base 180, fan 420, and filter 440. Fan 420 is coupled to fan support 620, and filter 440 is coupled to filter support 630. In some embodiments, air purifier 100 includes fin 610, which is disposed along the air flow path between fan 420 and front surface 120. Fin 610 may be a circular ring of fins.

In some embodiments, the air purifier can include different configurations that can be changed electronically. For example, the orientation of the air purifier can be changed by moving the air purifier with respect to the support structure along the hinges, so that the direction in which the column of clean air is blown by the air purifier can be adjusted. The speed of the fan can also be changed based on how far the user is located from the air purifier. In addition, the strength of filter can be adjusted by mechanically compressing the filter media, by inserting additional filtration media, and/or by replacing the entire filter as a self contained unit which can contain either higher or lower strength filtration media. As such, in some embodiments, the air purifier can include a motor configured to compress and decompress the filter. In some embodiments, the air purifier provides a user interface that enables a user of the air purifier to adjust those configurations. The user interface can be implemented locally at the casing of the air purifier (e.g., screen, knobs, buttons), or can be implemented as a mobile app, which can then be controlled via a mobile phone.

Alternatively, the air purifier can automatically change its configuration based on the context and environment in which the air purifier is located. In these embodiments, it has been contemplated that the air purifier of some embodiments can include a set of sensors and a programmable processing engine. For example, the programmable processing engine can include a processor, memory that can store software instructions that when executed by the processor, cause the processor to perform features and functions for the air purifier. The programmable processing engine can also include persistent storage such as a solid state drive to store data related to the air purifier, such as data related to a preferred fan setting or series of fan settings for a particular user.

In some embodiments, the programmable processing engine can be communicatively coupled to the set of sensors, and the processing engine can be programmed to change the configuration (e.g., fan speed) of the air purifier based on sensor data retrieved from the set of sensors. The set of sensors could be internally located within air purifier 100, or in addition or in the alternative, located externally to air purifier 100, but communicatively coupled to the processing engine wirelessly (e.g., by using Bluetooth or other short range wireless communication technologies). Contemplated sensors include thermocouples, humidity sensors, particle sensors, motion sensors, distance sensors, fan-speed sensors, air density sensors, air pollutant sensors, tag communication device (antenna) or other commercially suitable sensors for detecting an environmental condition.

Figure 7:
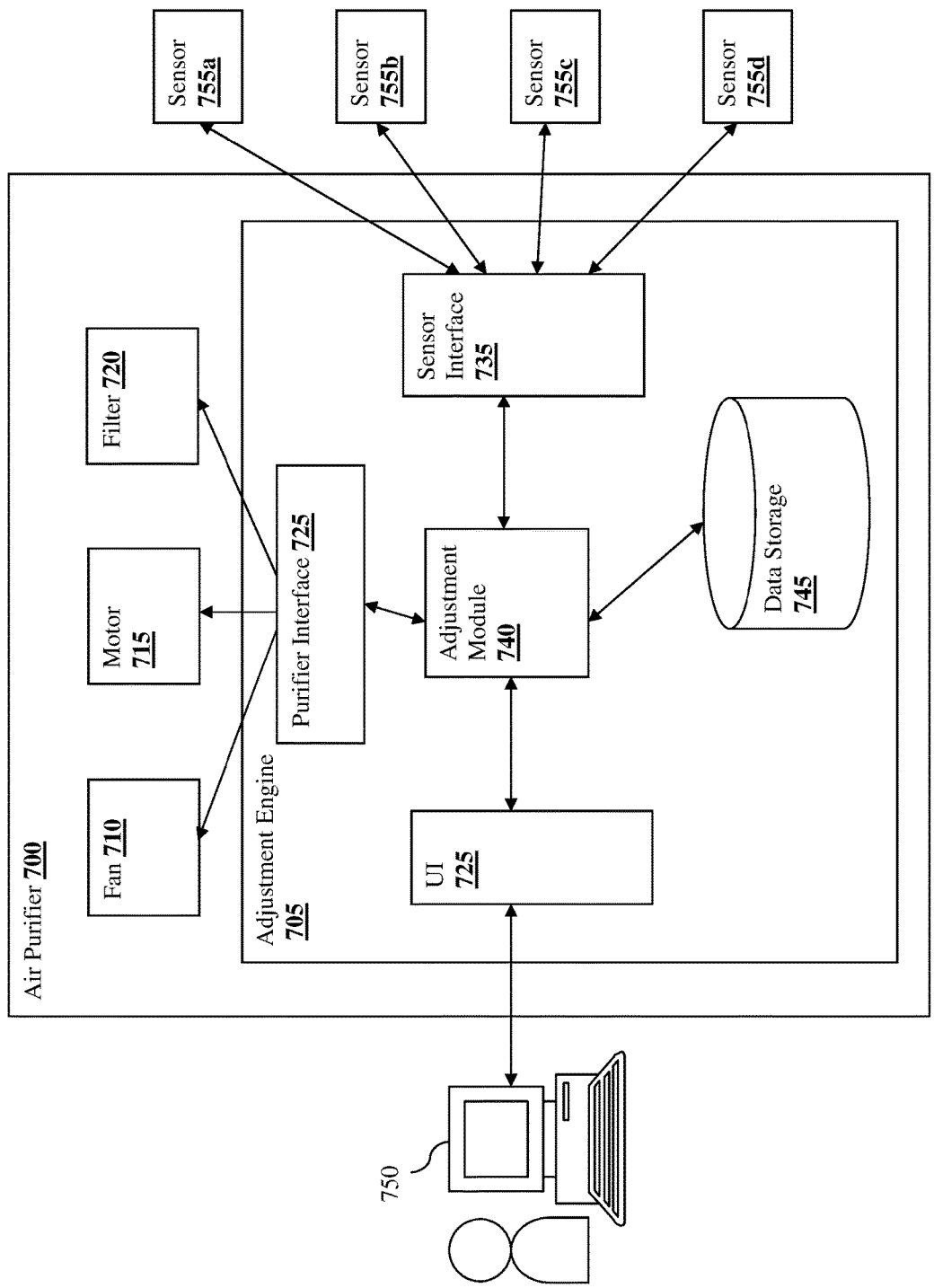
FIG. 7 illustrates a schematic of a programmable air purification system of some embodiments.

FIG. 7 illustrates an architecture of an example air purifier with sensors and programmable processor 700. Air purifier 700 includes an adjustment engine 705, a fan 710, a motor 715 for adjusting an orientation of the casing of the air purifier 700, and a filter adjustment unit 720. Filter adjustment unit 720 of some embodiments can include a motor or other mechanical device that is configured to compress and decompress the filter installed within air purifier 700. The adjustment engine 705 includes a user interface 725, and adjustment interface 730, a sensor interface 735, an adjustment module 740, and a data storage 745. User interface 725 of some embodiments is communicatively coupled with an input/output device such as a touch screen located on the air purifier 700 or wireless communicatively coupled with a computer or a mobile device 750 of a user. In some embodiments, adjustment engine 705 allows a user to input preferences such as preferred fan speed, preferred purifier orientation, etc. via user interface 725. Once the user preferences are entered, adjustment module 740 is programmed to store the user preferences in data storage 745. In some of these embodiments, when air purifier 700 is powered-up, adjustment module 740 is programmed to retrieve the user preferences data from data storage 745 and adjust the configurations of at least some of the elements of air purifier 700 (e.g., fan 710, motor 715, filter adjustment unit 720, etc.) via purifier interface 730 according to the retrieved user preferences data.

In addition to or instead of using the retrieved user preferences data to adjust the configuration of air purifier 700, it is contemplated that adjustment engine 705 can detect real-time environmental condition and context and automatically adjust the configuration of air purifier 700 based on the detected condition and context. In some embodiments, adjustment engine 705 is communicatively coupled with a set of sensors (e.g., sensors 755a-755d). As mentioned above, contemplated sensors include thermocouples, light sensors, radio frequency (RF) sensors, humidity sensors, temperature sensors, vibration sensors, particulate matter sensors, motion sensors, distance sensors, fan-speed sensors, air density sensors, tag communication device (antenna), air pollutant sensors, gas sensors, total volatile organic compound sensors, carbon dioxide sensor, sensors for specific type of gas, for example, formaldehyde or nitrogen dioxide, noise sensor or other commercially suitable sensors for detecting an environmental condition. Furthermore, some of these sensors 755a-755d can be disposed on or within air purifier 700, for example, to detect condition of the ambient air before it goes through the filter. In addition, some of the sensors 755a-755d can be disposed external to air purifier 700. Adjustment module 740 is programmed to retrieve sensor data from sensors 755a-755d via sensor interface 735. In some embodiments, sensor interface 735 also includes a wireless communication interface such as Bluetooth or other short range wireless communication interface to communicate with sensors that are external to air purifier 700. Based on the retrieved sensor data, adjustment module 740 is programmed to adjust the configuration of air purifier 700 by adjusting at least one of fan 710, motor 715, and filter adjustment unit 720 via purifier interface 730. In some embodiments, adjustment module 740 is programmed to override the user preferences according to data stored in data storage 745.

For example, when adjustment module 740 detects that certain pollutant in the air from the environment in which air purifier 700 is located has exceeded a certain level, adjustment module 740 is programmed to adjust fan 710 to increase the fan speed. In another example, air purifier 700 can be configured to work with a remote tag (which can be implemented as RFID tag, wireless communication module using Bluetooth, ANT, WiFi, or other wireless technology or another type of communication sensor, etc.) that is worn by the user. The remote tag can also be implemented within another device such as a mobile phone or a smart watch that can be worn by the user. In these embodiments, adjustment module 740 is programmed to detect a relative location (e.g., a distance and/or a direction) of the tag from the perspective of air purifier 700. Based on the detected relative location of the tag, adjustment module 740 is programmed to use motor 715 to adjust an orientation of air purifier 700 so that the column of clean air is directed at a direction toward the tag, and also adjust fan 710 by changing the fan speed based on the relative distance detected between air purifier 700 and the tag. Instead of using a tag, it is also contemplated that adjustment module 740 can use one or more motion sensors to detect a location of a user based on detected movement.

As mentioned above, the direction of the purifier exhaust can change based on the movement of the user, or detection of the location of the user within a room, either towards the user to direct the air in that direction, or away to provide more general air cleaning. Likewise, the fan and motor of the purifier can change accordingly, to increase the amount of purified air that is directed to the user or, in the case of no user detected, increase speed to maximum to facilitate cleaning of the air within the whole room.

The trigger of turning on air purifier 100 could be set according to different national regulated healthy levels. For example, Chinese indoor air healthy levels are set to have PM2.5 as 35 $\mu g/m^3$ and TVOC as 1.2 ppm. If the air purifier 100 runs in China and if sensors detected the pollutant concentrations exceeds corresponding levels, it will trigger the air purifier 100 to be turned on or run at higher fan speed. U.S. government set the indoor air healthy levels to have PM2.5 as 25 $\mu g/m^3$ and TVOC as 1 ppm. If the air purifier 100 runs in U.S. and if sensors detected the pollutant concentrations exceeds corresponding levels, it will trigger the air purifier 100 programmed to automatically change to operation mode (e.g., turning on the fan) or to operate at a higher fan speed. Also, from historical air quality data and purifier usage, the air purifier 100 is programmed learn user's preference overtime. When the ambient air quality drops below certain level from the baseline, the air purifier 100 can turn on or run at higher fan speed based on user historical controlling data.

As mentioned above, some of the sensors that are communicatively coupled with adjustment engine 705 can be disposed external to air purifier 700. It is contemplated that a difference between the air quality of ambient air (unfiltered air) and the air quality of the air that is around the user can be used to adjust the configuration of the air purifier 700 to optimize the effect for the user. As such, it is noted that sensors that measure air quality (e.g., particulate matter sensors, total volatile organic compound sensors, sensors for specific type of gas, for example, formaldehyde or nitrogen dioxide, gas sensors, temperature sensors, humidity sensors, etc.) can be implemented at both on or within air purifier 700 (e.g., within the air flow path before the air reaches the filter) and externally at or near the user. For example, the external sensor can be implemented or incorporated within a mobile device of the user, such as a mobile phone or a smart watch). In some embodiments, the external sensor can be implemented as a module that can be plugged into a mobile phone, and use the wireless communication interface of the mobile phone to communicate with adjustment engine 705. Alternatively, the external sensor can also include a wireless communication interface for communication with adjustment engine 705.

It is noted that the same type of sensor could be implemented both at (on or within) air purifier 700 (e.g., sensor 755*a*) (referred to as "remote" or "external" sensors) and at a location near the user (where the column of clean air is directed) (e.g., sensor 755*d*) (referred to as "local" or "internal" sensors). Adjustment module 740 is programmed to retrieve sensor data from both sensors 755*a* and 755*d*, perform a comparison between the sensor data from the two sensors, and generate a new configuration for air purifier 700 that can maximize the effect for the user. Adjustment module 740 is then programmed to adjust at least one of the components of air purifier 700 (e.g., fan 710, motor 715, filter adjustment unit 720, etc.).

In some embodiments, a filter sensor is also implemented within air purifier 700. Each filter being installed within air purifier 700 can communicate with air purifier 700 information about the filter (e.g., the type of filters (for filtering what pollutants and its efficiency, etc.) being used in the filter matrix, etc.).

In one example, the cleanliness of the air can be a configurable setting by the user, as a preference, via user interface 725. If the detected air by the remote (external) sensor is not to the preferred level in view of the sensor data retrieved from the local (internal) sensor, adjustment module 740 is programmed to adjust the motor/fan speed (by adjusting fan 710 via purifier interface 725) to enable additional clean air to be projected toward the user's area. Similarly, adjustment module 740 is programmed to also adjust the angle or direction of the exhausted clean (e.g., by adjusting motor 715 via purifier interface 725) such that air purifier 700 can increase/decrease the amount of clean air directed in the user's direction. The local (internal) sensor on the air purifier 700 detects ambient air quality. By knowing the filter type being applied (air purifier 700 is programmed to retrieve filter information from the filter sensor via sensor interface 735), the air purifier 100 is programmed to calculate approximately the desirable air quality around the user over the distance of the clean air flow (or clean air bubble) based on the detected ambient air quality, the type of filter used in air purifier 700, and current fan speed. Take particulate matter for example, if the concentration of particulate matter of the ambient air detected by the local (internal) sensors is 80 $\mu g/m^3$, and if the current filter assembly is detected to have efficiency toward particulate matter as of 95%, and when the fan is running around 50% rpm range, then the air purifier 700 is programmed to determine that the desirable air quality coming right out of the air purifier 100 would have particulate matter concentration around 80×(1−95%)=4 $\mu g/m^3$. Furthermore, if the entrainment ratio is 30% at the distance of 0.6 m based on fan speed as of 50% rpm range, then air purifier 100 is programmed to determine that at 0.6 m, the particulate matter concentration should roughly be 4 $\mu g/m^3$×70%+80 $\mu g/m^3$×30%=∼26.8 $\mu g/m^3$. This is just a theoretical number based on engineering testing of the device. Under the same filter condition, at the same distance, higher fan speed would generate lower entrainment ratio, which will lead to cleaner air quality. Adjustment module 740 is programmed to use sensor data retrieved from remote (external) sensors to determine how fast the fan should run. Continue with the example above, at fan speed of 50% rpm range, the theoretical concentration of particulate matter at 0.6 m is 26.8 µg/m³. When user sit at 0.6 m with the remote sensor, if the remote sensor detects the real particulate matter is ~40 µg/m³, which is higher than theory, then the air purifier 100 is programmed to adjust the fan to have higher speed, (e.g., to 60% rpm range). At this speed, the entrainment ratio at 0.6 m would be 25%, so the particulate matter concentration would decrease to 4 µg/m³×75%+80 µg/m³×25%=~23 µg/m³. The air purifier 100 would know where is the user sitting by motion sensor or infrared distance sensor, thus can adjust the fan speed according to user distance and remote sensor reading. The difference between the theoretical concentration and real concentration could be due to reduced filter efficiency overtime, to the third party air flow influence, or to baseline reading difference between different sensors.

Air purifier 100 may also contain a system that may rely on motors or servos that allows the angle and direction of front surface 120, and the resulting direction of the outgoing airflow from the air purifier, to automatically be adjusted based on programming from the processing engine, instructions from a user, or sensor readings.

In one contemplated use, this system allows air purifier 100 to increase the perceived air quality experienced by a user. As used herein, the phrase "perceived air quality" means the air quality that a user experiences and perceives in his or her breathing zone (i.e. the head, nose and mouth area).

In some embodiments, air purifier 100 accomplishes this by delivering filtered clean air directly to the breathing zone of a user (i.e. the head, nose and mouth area), which results in an improved perception of air quality (temperature, humidity, smell, cleanliness) by the user. In some embodiments, air purifier 100 delivers clean air directly to the breathing zone with enough momentum to penetrate the rising thermal plume from human body heat.

The clean air direction, speed and level of cleanness can be adjusted and controlled manually by the user or programmatically via the processing engine. It is further contemplated that in some embodiments, instructions from a user or from programming can be incorporated with data from sensors, including room temperature data, humidity, pollution level data, gas presence data, barometric pressure data, and other environmental parameters.

In another contemplated use of the inventive subject matter, air purifier 100 can circulate air throughout a specific area, such as a room and thus filter the air in the entire space, as opposed to focusing solely on the breathing zone of a user. In this situation, it is contemplated that this would improve overall indoor air quality in the space, and could be particularly useful during periods where the outdoor air quality is particularly poor or if multiple people are detected nearby and generally affecting indoor air quality.

It is contemplated that air purifier 100 could be a stand-alone unit, appropriate for portable use, or could also be mounted permanently to surface in a building.

Figure 8:
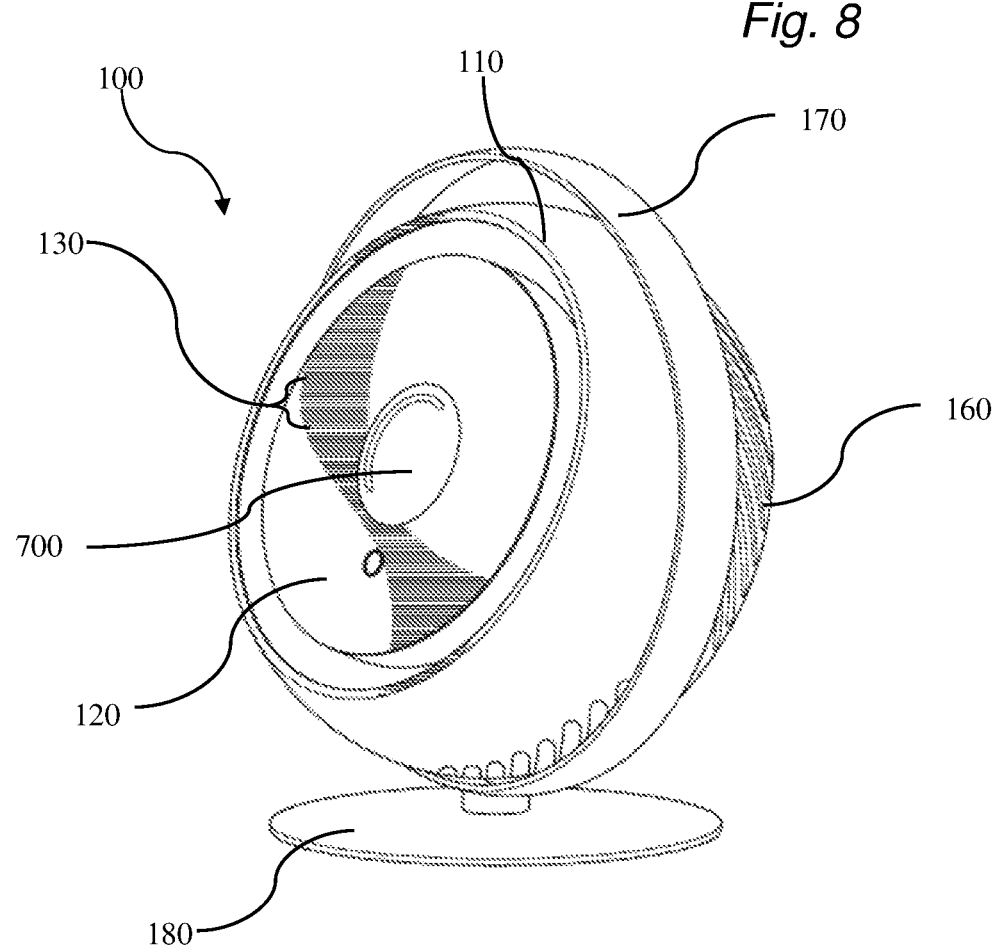
FIG. 8 is a front-side view of an air purifier with a user interface.

FIG. 8 shows a front perspective view of air purifier 100. Air purifier 100 has casing 110, front surface 120, gap 130, intake 160, ring 170, and base 180. Air purifier 100 also includes UI system 700, which may be a touch screen panel, LCD panel, or other suitable interface for user interaction. In some embodiments, a user can adjust a setting of the air purifier via UI system 800.

In some embodiments, UI system 700 can be remotely programmed via a wired or wireless connection to a smart phone, computer, or internet server.

Figure 9:
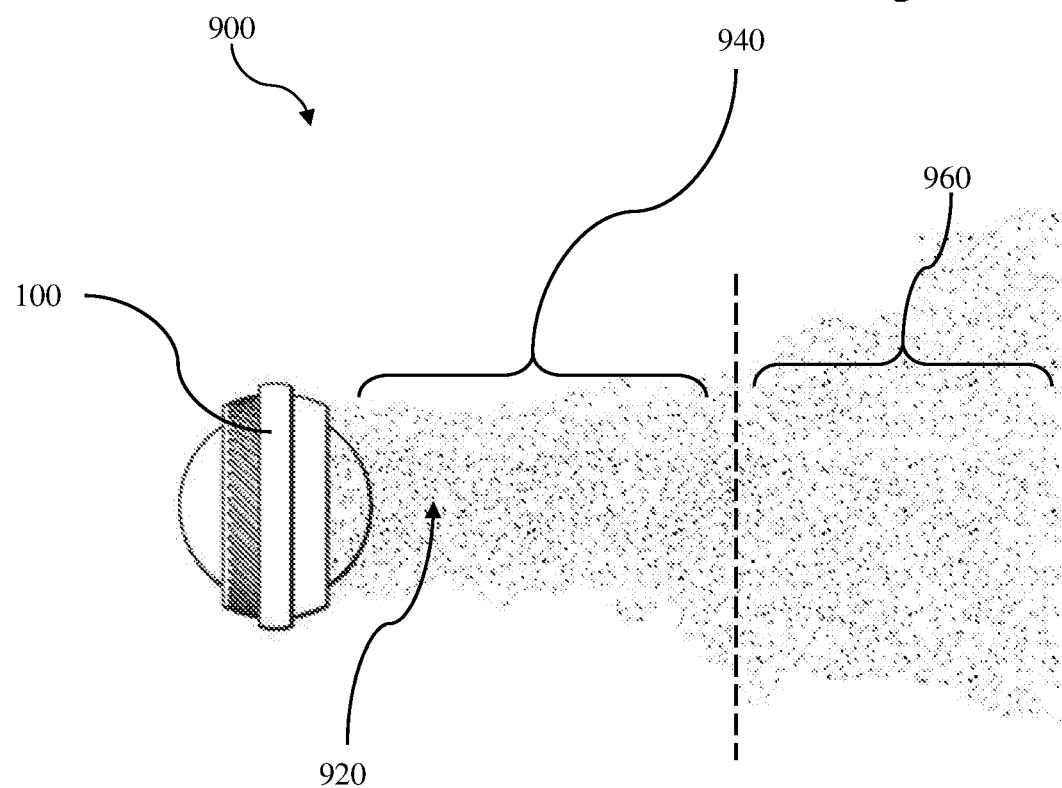
FIG. 9 is a top view of an air purifier and column of filtered air.

FIG. 9 shows ventilation system 900, which comprises air purifier 100 and air column 920, which exits the front of air purifier 100. Air column 920 is composed of low-entrainment section 940, and higher entrainment section 960. In preferred embodiments, low-entrainment section 940 extends 6 meters from air purifier 100. In more preferred embodiments, low-entrainment section 940 extends 6 meters from air purifier 100, and in most preferred embodiments, low-entrainment section 940 extends 1.5 meters from air purifier 100. As used herein, entrainment means the drawing in or transport of ambient air in a stream of clean filtered air.

In preferred embodiments, low-entrainment section has an entrainment ratio less than 10%, in more preferred embodiments an entrainment ratio less than 25%, and in most preferred embodiments, an entrainment ratio of less than 40%. As used herein, entrainment ratio is calculated as entrainment flow divided by the driving flow.

In contemplated uses of the inventive subject matter, the low-entrainment section 940 creates a pocket of clean air around the targeted area even when the door or window is open to a room. For example, even if there is an infusion of dirty air entering the room through a window or door, the low-entrainment ration of low entrainment section 840 deliver clean air to the user's breathing zone.

Some contemplated advantages of the inventive subject matter include increased efficiency. Because the pocket of clean air produced as a result of low-entrainment section 840 is much smaller than the overall volume of air in a room, the pocket of clean air can be generated much quicker than attempting to clean the air in a whole room. Therefore, there is no need to run the air purifier constantly in order to maintain the necessary air quality, which saves energy and money and decreases wear and tear on mechanical components like fans and motors.

Additionally, the contemplated inventive subject matter generates less fan noise or general noise is generated as a result of requiring a smaller or slower fan.

However, there may be instances where extra cleaning of the air within a room is desired, such as by people with severe allergies or certain lung diseases. In order to achieve a higher level of air cleanliness, air purifier 100 can be programmed to run at a higher speed or "turbo mode" while the room is unoccupied. Turbo mode can be initiated manually or programmatically through the use of location services, GPS, motion sensors or programmable schedules.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A ventilation system, comprising:
   base,
   a casing pivotally disposed on the base and comprising a front surface having an annular gap and a back surface comprising one or more openings,
   a fan disposed within the casing and configured to pull a flow of air into the one or more openings and push the air out of the annular gap to thereby dispense air in a ring and entrain a column of clean air in a direction away from the front surface and in front of the casing; and
   a removable filter disposed within the casing and in an airflow path between the annular gap and the one or more openings, and upstream of the fan.

2. The ventilation system of claim 1, wherein the filter is a ring filter, in which air enters into a side of the filter.

3. The ventilation system of claim 1, wherein the airflow path is configured to draw air into the center of the casing, and wherein the airflow path narrows as it approaches the outer edge of the casing toward the annular gap.

4. The ventilation system of claim 1, further comprising a ring of fins within the air flow path interposed between the fan and the annular gap.

5. The ventilation system of claim 1, wherein the fan comprises one of a cylinder fan, a propeller, and an impeller.

6. The ventilation system of claim 1, wherein an area of the front surface of the casing between a center of the front surface and the annular gap is solid.

7. The ventilation system of claim 1, wherein the filter is a particle filter.

8. The ventilation system of claim 6, wherein the annular gap and the fan are configured to cause the flow of air out of the ventilation system to have an entrainment ratio of less than 40% at a distance of 1.5m.

9. The ventilation system of claim 1, wherein the casing pivotally couples with the base at a hinge that is configured to rotate the casing with respect to the base and about a first axis.

10. A programmable air purifier, comprising:
    a sensor configured to produce sensor data;
    a replaceable filter;
    a casing pivotally disposed on a base, the casing encompassing the fan and the filter, and comprising a back surface having one or more openings and a front surface having an annular gap for entraining a column of filtered air, wherein the movable casing is movable with respect to a support structure of the air purifier;
    a fan disposed within the casing and configured to pull a flow of air into the one or more openings and push the air out of the annular gap to thereby dispense air in a ring and entrain a column of clean air in a direction away from the front surface and in front of the casing; and
    a customization engine communicatively coupled to the movable casing, the fan, and the filter, and programmed to:
    periodically retrieving sensor data from the sensor, and
    automatically adjust a configuration of at least one of the filter, the fan, and the movable casing.

11. The air purifier of claim 10, further comprising a hand-operable opening to the casing configured to allow access to replace the filter.

12. The air purifier of claim 10, wherein the annular gap of the movable casing is a ring-shaped gap having a cross-section with an inner radius that is within 40% of the outer radius.

13. The air purifier of claim 12, wherein the width of the ring-shaped gap causes the filtered air to have an entrainment ratio of less than 30% at a distance of 0.2m.

14. The air purifier of claim 12, further comprising an air pathway within the casing, wherein the air pathway gradually reduces in size toward the gap.

15. The air purifier of claim 10, wherein the sensor comprises at least one of: a thermocouple, a humidity sensor; a particle sensor; a motion sensor; a distance sensor; a fan-speed sensor; an air density sensor.

16. The air purifier of claim 10, wherein the customization engine is configured to adjust a speed of the fan.

17. The air purifier of claim 10, further comprising a portable tag external to the movable casing, wherein the customization engine is further programmed to:
    retrieve, from the sensor, a relative location of the tag with respect to the casing; and
    configure the movable casing to point the annular gap toward a direction of the tag from the perspective of the movable casing.

18. The ventilation system of claim 1, further comprising a hand-operable opening to the casing configured to allow access to replace the filter.

19. The ventilation system of claim 1, further comprising a filter adjustment unit configured to mechanically compress the filter.

20. The ventilation system of claim 1, wherein the casing is pivotally coupled with the base via a ring.

21. The ventilation system of claim 20, wherein the casing is pivotally coupled with the ring at a first hinge and the ring is pivotally coupled with the base via a second hinge.

22. The ventilation system of claim 20, wherein the first hinge allows for adjust of the casing about a first axis and the second hinge allows for adjustment of the casing about a second axis that is non-parallel to the first axis.

23. The ventilation system of claim 21, wherein the first hinge allows for adjust of a pitch of the casing and the second hinge allows for adjustment of a yaw of the casing.

24. The ventilation system of claim 1, wherein the at least one opening comprises a plurality of openings disposed in a ring.

* * * * *